2 Sheets--Sheet 1.

B. T. RONEY.

Improvement in Base-Burning Stoves.

Figure 1:
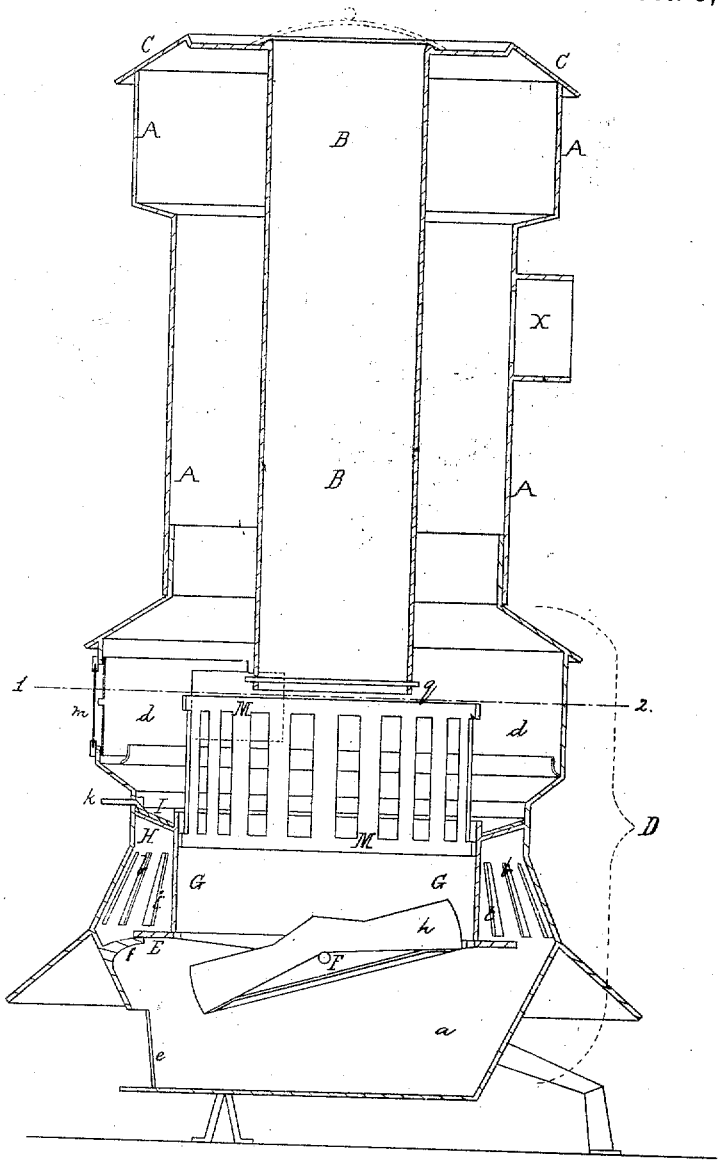

No. 5,096. Fig. 1. Reissued Oct. 8, 1872.

Witnesses:
Wm. R. Wright.
Thos. A. Burtt.

Adam R. Reese
by his Atty, assignee
Horace Binney, 3rd

2 Sheets--Sheet 2.

B. T. RONEY.

Improvement in Base-Burning Stoves.

No. 5,096. Reissued Oct. 8, 1872.

Adam R. Reese, Assignee
by his Atty,
Horace Binney, Jr.

Witnesses:
Wm. R. Wright,
Thos. A. Brett.

UNITED STATES PATENT OFFICE.

BENJAMIN T. RONEY, OF BRISTOL, PENNSYLVANIA, ASSIGNOR BY MESNE ASSIGNMENTS TO ADAM R. REESE, OF PHILLIPSBURG, NEW JERSEY.

IMPROVEMENT IN BASE-BURNING STOVES.

Specification forming part of Letters Patent No. 33,367, dated September 24, 1861; reissue No. 5,096, dated October 8, 1872.

*To all whom it may concern:*

Be it known that BENJAMIN T. RONEY, deceased, of Bristol, in the county of Bucks and State of Pennsylvania, did in his life-time invent a certain new and useful Improvement in Coal-Stoves; and I do hereby declare the following to be a full, clear and exact description thereof, which will enable others skilled in the art to which it appertains to make and use the said improvement, reference being had to the accompanying drawing which forms a part of this specification, and in which—

Figure 2:
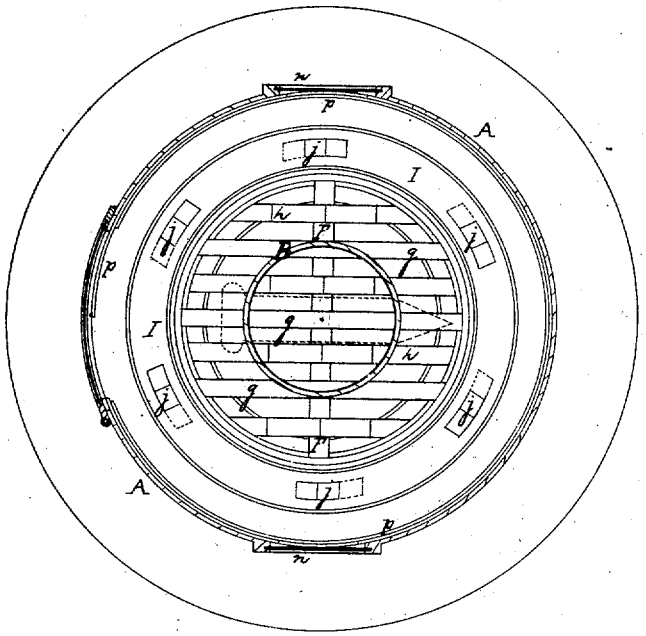

Figure 1 is a vertical section of the said improved coal-stove; and, Fig. 2 is a sectional plan thereof on the line 1, 2, Fig. 1.

The same parts are denoted by the same letters in both figures.

The said improvement consists, first, in the combination, in a base-burning stove, of a fuel-magazine which is fed through the top of the stove and extends downward to within a short distance of a fire-pot of larger diameter than said magazine and located below the lower edge of the magazine, and a series of mica plates arranged opposite to the annular open space between the top of the fire-pot and bottom of the magazine; secondly, in devices which may be interposed to protect the mica plates from smoke and dust during the kindling; thirdly, in an annular plate, so constructed and arranged that by turning it the draft may be regulated, or the escape of dust into the room prevented, as hereinafter described.

A, in the drawing, represents the upper casing of the stove; B, the magazine which contains the fuel; and, C, the cap attached to the upper ends of the exterior casing and of the magazine. X is the stove-pipe, through which the products of combustion pass to the chimney. D is the lower casing of the stove, in which are three compartments—viz., the ash-pit *a*, the air-chamber *b*, and fire-chamber *d*. The ash-pit *a* has in front an opening, *e*, for the admission of the usual drawer to receive the ashes, and has any convenient number of lugs or projections, *f*, on which rests the annular plate E with its permanent bars *g*; beneath the latter is a spindle, F, passing through and turning in the opposite sides of the base, and furnished at one end with a suitable handle—the spindle having a number of bars, *h*, of the peculiar form represented in the drawing, and each bar moving between two of the permanent bars *g* of the annular plate E as the spindle is vibrated. To the inner edge of the annular plate E is secured the lower part G of the fire-pot, consisting of a hollow metal cylinder, whose upper end is connected to the exterior casing which forms the base D of the stove by means of a partition, H—the latter separating the air-chamber *b* from the fire-chamber *d*, and having a number of openings, *j*, best observed on reference to the plan view, Fig. 2. On this partition H rests an annular plate, I, which has a number of openings coinciding in number, size and position with the openings *j* of the partition H, the plate being provided with a handle, *k*, which projects through an oblong slot in front of the base of the stove and enables the attendant to turn the plate partly round so as to close the openings *j* of the partition, or so as to cause the openings of the plate and partition to coincide and thereby present a free communication between the air-chamber *b* and fire-chamber *d*. To the inside of G is secured the upper part M of the fire-pot, consisting of a hollow metal cylinder and so situated that its upper edge shall be but a short distance below the lower edge of the magazine B. The diameter of the fire-pot, as shown in the drawing, is larger than that of the magazine. The fire-chamber *d* is provided in front with a door, *m*, which consists of a frame containing a plate of mica; and in the sides of the fire-chamber may be framed any convenient number of mica plates, *n*. On the inside of the fire-chamber and fitting close to the casing of the same, are slides *p p*, which are so arranged that they can be readily moved away from the mica plates of the door and from those framed into the side of the fire-chamber, or may be slid to such a position as to cover the said mica plates. Near the lower edge of the magazine B oblong openings may, if desired, be made for receiving a slide, *q*, which is of such a width as to prevent the fuel in the magazine from falling therefrom into the upper part M of the fire-pot until the kindling material is ignited and the slide withdrawn. In preparing the stove for use in the first instance the magazine B is filled through its open top with coal; a suitable cover is then placed on top of the magazine, so as to prevent the air and products of combustion from passing through the store of fuel therein; and suitable kindling material is deposited on the grate of the fire-pot and then ignited. During the preliminary igniting of the fuel care should be taken to cover the mica plates of the door and sides of the fire-chamber by means of the slides *p p*, thereby preventing smoke and dust from obscuring the plates and destroying their translucency. When the stove is in full operation the red-hot cinders and ashes are contained in the lower part G of the fire-pot, and the partially-consumed fuel in the upper part thereof; and owing to the position of the mica plates in the door and sides of the stove on a level with the space between the top of the fire pot and bottom of the magazine, the flame will be visible through them. The position of the fire-pot in respect to the air-chamber *b* and opening *t*, enables the foul air of the apartment to be carried off through the openings into the ash-pit and used as a means of supporting combustion, while heat from the red-hot fire-pot will be radiated through the openings and add to the heat imparted to the room by other parts of the stove. By altering the position of the annular plate I more or less air may be made to pass through the partition H instead of downward into the ash-pit, thereby checking the draft of the stove at pleasure; and by moving the said annular plate so as to expose the openings of the partition, the dust created by the raking of the fire is allowed to pass upward through the body of the stove instead of being discharged into the apartment.

What I claim as the invention of the said BENJAMIN T. RONEY, and desire to secure by Letters Patent of the United States, is—

1. The combination, in a base-burning stove, of a fuel magazine which is fed through the top of the stove and extends downward to within a short distance of a fire-pot of larger diameter than said magazine, and a series of mica plates arranged opposite to the annular open space between the top of the fire-pot and bottom of the magazine.

2. A stove constructed with devices which may be interposed to protect the mica plates from smoke and dust during the kindling.

3. The annular slotted plate I, arranged and operating substantially as described.

ADAM R. REESE.

Witnesses:
ED. J. FASY,
W. W. DOUGHERTY.